A. D. GROVER AND E. E. BARBER.

VENDING MACHINE.

APPLICATION FILED DEC. 23, 1919.

Reissued July 27, 1920.

14,925.

3 SHEETS—SHEET 1.

INVENTORS.
Albert D. Grover.
Earl E. Barber.
by A. A. Thomas
Atty.

A. D. GROVER AND E. E. BARBER.
VENDING MACHINE.
APPLICATION FILED DEC. 23, 1919.
Reissued July 27, 1920.
14,925.
3 SHEETS—SHEET 2.
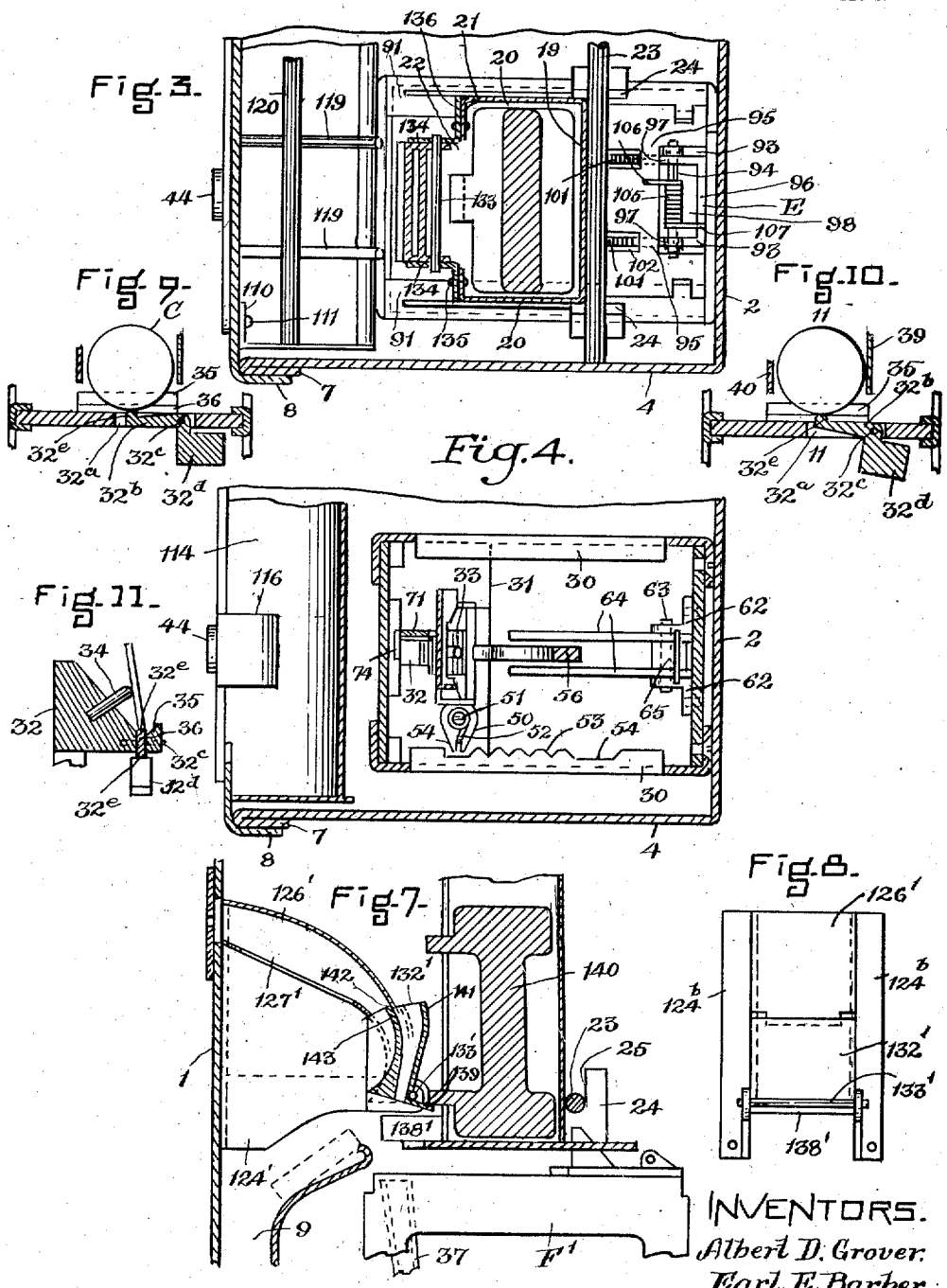
INVENTORS.
Albert D. Grover.
Earl E. Barber.
by A. H. Thomas
Att'y

A. D. GROVER AND E. E. BARBER.

VENDING MACHINE.

APPLICATION FILED DEC. 23, 1919.

Reissued July 27, 1920.

14,925.

3 SHEETS—SHEET 3.

INVENTORS.
Albert D. Grover.
Earl E. Barber.

by A. A. Thomas
Atty.

UNITED STATES PATENT OFFICE.

ALBERT D. GROVER, OF NEW YORK, N. Y., AND EARL E. BARBER, OF BOSTON, MASSACHUSETTS, ASSIGNORS, BY MESNE ASSIGNMENTS, TO AUTOSALES CORPORATION, A CORPORATION OF NEW YORK.

VENDING-MACHINE.

14,925. Specification of Reissued Letters Patent. Reissued July 27, 1920.

Original No. 1,260,372, dated March 26, 1918, Serial No. 711,797, filed July 27, 1912. Application for reissue filed December 23, 1919. Serial No. 347,017.

*To all whom it may concern:*

Be it known that we, ALBERT D. GROVER and EARL E. BARBER, citizens of the United States, and residing, respectively, at New York, county of New York, and State of New York, and Boston, county of Suffolk, and State of Massachusetts, have invented certain new and useful Improvements in Vending-Machines, of which the following is a specification.

Our invention relates to vending machines adapted to be operated upon the deposition of a proper coin for the delivery of a suitable commodity, and has for its general object the provision of a machine embodying various features of novelty over anything disclosed in prior machines. Our machine is of the magazine type and is so compact in its arrangement of parts that a machine containing several magazines takes up comparatively little room. The different parts that go to make up our machine are inclosed in a substantially rectangular casing, preferably made of sheet metal, beyond which no parts project to cause obstruction or unsightliness. Our machine is thus excellently adapted for use in places where but little space is available—as, for instance, on railroad cars.

One object of our invention is to provide a movable coin carrier having a rigid pin or projection adapted to hold the coin in operative position during the movement of the carrier, so that the coin may operate as a connection between the coin carrier and a suitable member connected with the ejecting mechanism. The pin or projection on the carrier engages the coin substantially at the center, so that a washer falls back on the carrier into inoperative position.

In the preferred form of our invention, the coin carrier is provided with a yieldable member arranged to hold a coin of less than the prescribed weight in such position that it is readily stripped from the carrier by the member connected with the ejecting mechanism, without causing operation of that member. In the precise embodiment of our invention illustrated in the accompanying drawings, this yieldable member is in the form of a weighted arm having a free end which projects into a coin-retaining groove on the carrier. It is necessary that the coin depress this free end of the weighted arm in order to assume an operative position on the carrier.

A further object of our invention is to provide a coin chute so constructed that only one coin may be retained therein at a time. More specifically considered, our new form of coin chute is provided with a laterally displaced portion at its lower end, so that a second coin dropped into the chute while the first coin is retained in the displaced portion, will strike the edge of the retained coin off center and be thereby automatically ejected through a lateral opening in the chute.

A further object of our invention is to provide a pivoted switch at a suitable point in the coin chute leading to the coin carrier for automatically causing a deposited coin to be refunded when the magazine is empty. The normal position of the switch is such that a deposited coin will find its way to the coin carrier. However, as soon as the last package has been ejected from the magazine, the switch is automatically tilted so as to divert the deposited coin into a refunding chute open to the outside, so that the patron may get his money back.

A further object of our invention is to provide means under the control of the coin carrier for supporting a deposited coin in the coin chute when the carrier is out of normal position. The arrangement is such that the return of the carrier operates the supporting means to release the coin which thereupon drops on the carrier.

A further object of our invention is to provide a multiple-magazine machine in which the operating mechanism associated with each magazine is carried by a frame work which is removable as a unit from the machine, independently of the other mechanisms. Also, the magazines associated with the ejecting mechanisms are so mounted in the casing as to be readily removable independently of each other.

The above and other objects and advantages of our invention will become apparent from a detailed description of the accompanying drawings, in which—

Fig. 3 is a sectional view in plan taken substantially on the irregular line 3—3 of Fig. 1;

Fig. 4 represents a sectional view on line 4—4 on Fig. 1;

Fig. 7 is a fragmentary view in detail showing a modified arrangement of the switch for refunding a deposited coin when the machine is empty;

Fig. 8 is a rear view of the modified switch arrangement shown in Fig. 7, the magazine being omitted from this figure;

Fig. 9 is a fragmentary sectional view on line 9—9 of Fig. 1 showing the position of a coin of proper weight on the coin carrier;

Fig. 10 is a view similar to Fig. 9 showing the position of a coin of less than prescribed weight on the coin carrier; and Fig. 11 is a cross-sectional view on line 11—11 of Fig. 10.

Figure 5:
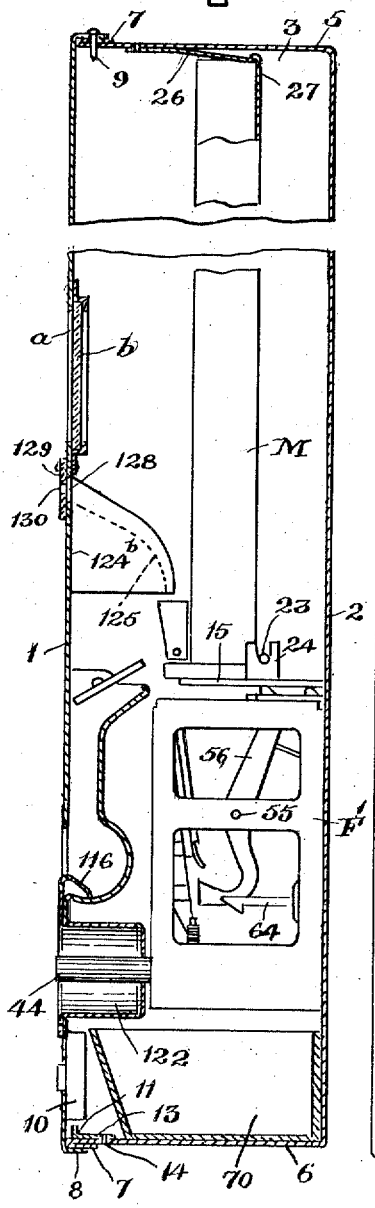
Fig. 5 is a longitudinal section on line 5—5 of Fig. 6.

The different parts that make up the mechanism of our machine are housed in a substantially rectangular casing constructed preferably of sheet metal and having a front wall or panel 1, a rear wall 2, sides 3 and 4, a top 5 and bottom 6. The metal on the front edge of the casing is bent back upon itself, as shown at 7 in Figs. 3, 4 and 5, to provide a double thickness of metal for reinforcement. The front panel is formed with a continuous flange 8 which is adapted to fit over the reinforced edge 7 of the casing, as clearly shown in Figs. 3, 4 and 5. In this way a tight closure is effected between the front panel and the main body of the casing, and the reinforcement along the line of closure prevents the parts from being easily separated by the attempted insertion of a hand tool. The front panel is removably mounted on the casing by means of pins or lugs 9 secured to the top portion of the flange 8 and extending downwardly through corresponding openings in the top of the casing, as shown in Fig. 5. A lock 10 of suitable construction is secured upon the inner side of the front panel near the bottom, and the bolt 11 of the lock is adapted to engage the upstanding lug 12 of the locking plate 13 secured to the bottom 6 of the casing by rivets 14, or otherwise. To remove the front panel, it is therefore only necessary to unlock it at the bottom and then swing the panel outwardly at its lower end sufficiently to permit its being lifted out of engagement with the casing at the top.

In the casing are secured two transverse shelves or partitions—an upper shelf 15 and a lower shelf 16. These shelves are held in place in any suitable manner,—as, for instance, by means of rivets 17 which pass through the sides of the casing and through flanges 18 formed at the two ends of the shelves. The upper shelf 15 is arranged to support a series of magazines in which the vendible articles are stacked. The number of magazines may vary, depending upon the size and capacity for which the machine has been designed. In the particular form shown in the drawing, the machine contains four magazines indicated at $M^1$, $M^2$, $M^3$ and $M^4$. The front panel 1 may be provided with sight openings *a*, one in front of each magazine, these openings being covered by a piece of glass *b*, suitably held in place on the inside of the front panel. Each of these magazines is a unit in itself, and is removable from the casing independently of the other magazines. The magazine is substantially rectangular in form and is proportioned to accommodate the vendible articles. The magazines are preferably constructed of sheet metal and comprise a rear wall 19, sides 20 and a front wall 21, which has a longitudinal opening 22. To the rear wall of each magazine near the bottom thereof is secured a horizontal rod 23 in any desired manner. The shelf 15 is provided with upwardly extending lugs or brackets 24 arranged in pairs and having vertical slots 25 adapted to receive the ends of the rods 23. By means of this arrangement, the magazines are readily placed in proper position on the shelf 15 and easily removable independently of each other. As the rods 23 fit snugly in the slotted brackets 24, the magazines are firmly held in place without danger of disarrangement during the operation or transportation of the machine. As seen from Fig. 3, the brackets 24 extend forward sufficiently to engage the sides of the magazines. This positively prevents transverse movement of the magazines. Such movement is also prevented by the rods 23 abutting against each other, as seen from Fig. 2. A spring 26 may be provided at the top of the casing to hook over the top of each magazine at 27 to assist in maintaining the magazines in an upright position when the machine is moved about.

Beneath each magazine is arranged a coin controlling ejecting mechanism adapted to be operated upon the insertion of a proper coin to eject the goods from the magazine. Each mechanism is carried by a frame work slidably mounted on the lower shelf 16 and removable independently of the other mechanisms. As the particular machine shown in the drawings is a four-compartment machine, there are four of these frameworks diagrammatically indicated in Fig. 6 by $F^1$, $F^2$, $F^3$, and $F^4$. As these frameworks and the mechanisms carried thereby are identical in construction, it will be necessary to describe only one of the frameworks and its mechanism. Referring to Fig. 2 it will be seen that the framework $F^1$ is at its lower end provided with a pair of inwardly turned flanges 28 adapted to interlock with upwardly and outwardly turned flanges 29 formed on the shelf 16. The flanges 29 are arranged in pairs, one pair for each framework, so that each framework may be slid into position on the shelf, or removed therefrom, without disturbing the other frameworks. As seen from Fig. 2, the adjacent sides of the frameworks are quite close together. On each side of the framework near the bottom is provided a pair of inwardly turned flanges 30 spaced apart to form a pair of opposite guide grooves or channels for the base plate 31 of the coin carrier 32. This coin carrier is formed with an inclined surface 33 from which projects a pin 34. From the lower end of the inclined surface 33 extends a ledge 35 at an angle to that surface, so as to provide a coin-retaining groove or recess 36 for a coin of proper weight. The base plate 31 of the coin carrier 32 is provided with a slot $32^a$ as best shown in Figs. 9 and 10. In the opening $32^a$ is pivoted an arm $32^b$ at the point $32^c$. This arm has at one end a weighted portion $32^d$, and at the other end an upstanding lug or projection $32^e$ which is normally adapted to extend into the groove 36, as shown in Fig. 10. The projection $32^e$ is so arranged on the coin carrier that when a coin drops into the carrier it strikes the projection centrally. If the coin is of proper weight, it will be sufficient to depress the projection $32^e$ and assume the position shown at C in Fig. 9. In this, its operative position, the coin rests at its lower edge in its retaining groove 36 and is supported in the inclined position shown in Fig. 1 by resting against the lower end of the coin chute to be presently referred to. Should the deposited check be of light material, such as paper or aluminum, it will not be capable of depressing the upstanding projection $32^e$ of the weighted arm $32^b$, and will be held by said projection out of the coin-retaining groove 36, as clearly shown in Figs. 10 and 11. When a coin is thus supported on the projection $32^e$, it is in position to be readily stripped from the coin carrier by the oscillating lever which is connected with the ejecting mechanism, as will presently be described.

Figure 1:
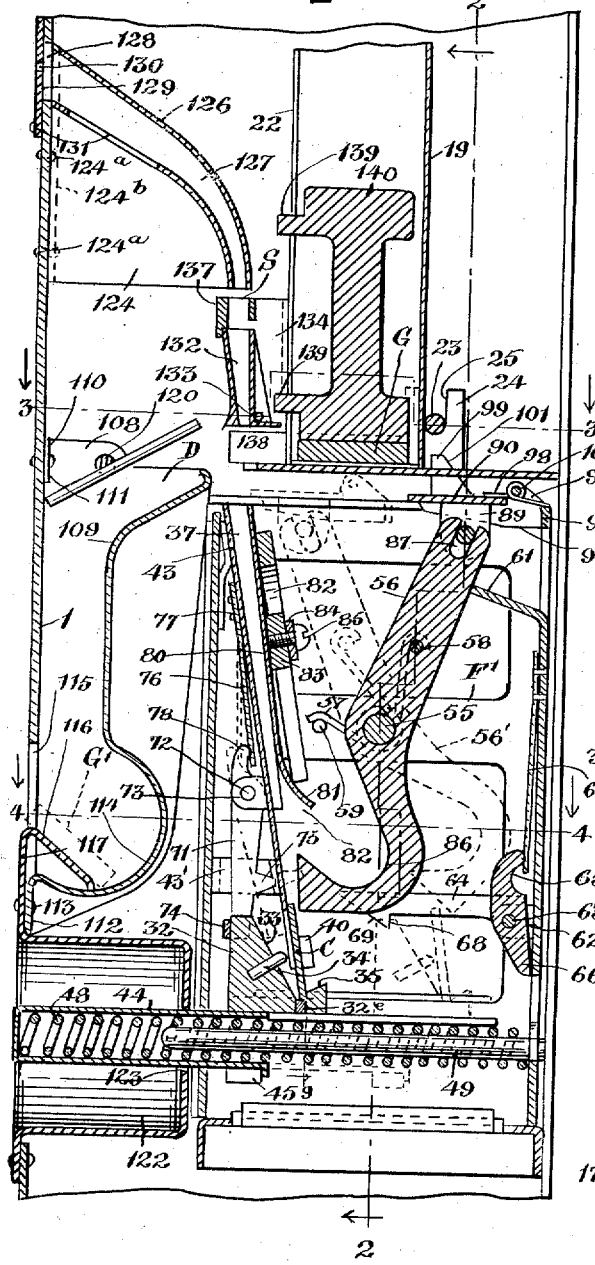
Figure 1 shows a longitudinal section on an enlarged scale, through a portion of our machine, substantially on line 1—1 of Fig. 6, with parts of the casing broken away above and below.
Figure 2:
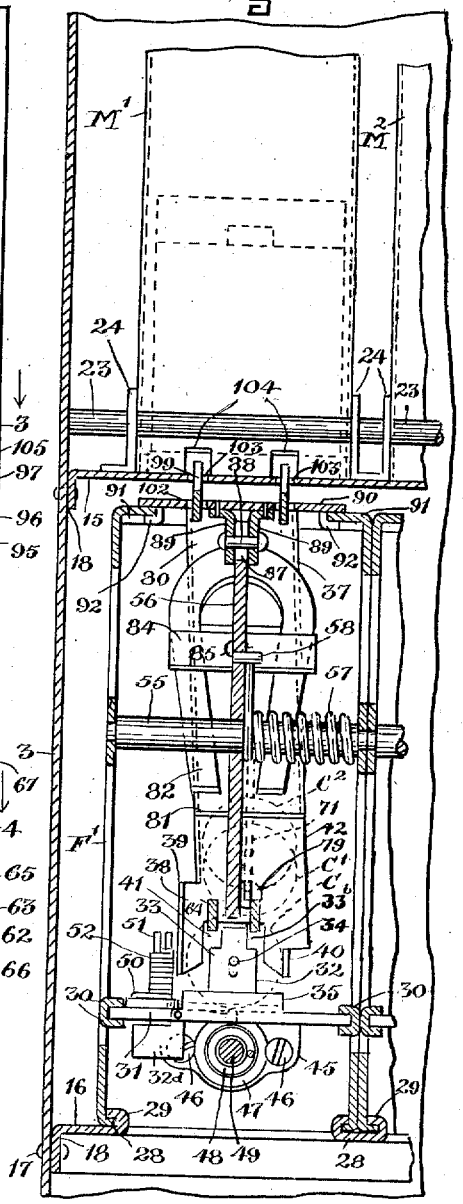
Fig. 2 is a section substantially on the broken line 2—2 of Fig. 1.

When the coin carrier 32 is in normal position, as shown in Fig. 1, a coin passing through the chute 37 is received by the coin carrier and retained in the lower end 38 of the chute. As seen from Fig. 2, the lower end 38 of the chute 37 is laterally displaced with respect to the main body portion of the chute, and is in alinement with the coin carrier. The laterally displaced portion 38 of the coin chute 37 has sides 39 and 40 between which the coin C is held, but is open toward the rear to allow the coin to be carried rearwardly by the coin carrier 32. The front wall of the lateral extension 38 of the coin chute is provided with a slot 41 to allow the passage of the coin carrier therethrough. The coin chute 37 is open at 42 for a purpose to be presently explained. When a coin drops down the coin chute 37, it strikes the top of the side flange 40 and is deflected toward the left (as viewed in Fig. 2) into the extension 38 and onto the coin carrier 32, as best indicated at C in Fig. 2. If, while the coin C is retained by the carrier in the laterally displaced portion 38 of the coin chute, a second coin should be dropped into the coin chute, it will strike the coin C off center, as indicated at C′ in Fig. 2, whereby it will be automatically ejected through the lateral discharge opening 42. It is thus impossible for more than one coin to remain in the coin chute 37 at one time. Otherwise, the coin chute might become clogged up with successively deposited coins and the machine thus put out of commission. The coin chute 37 is rigidly mounted in the framework F′ by any suitable means. In Fig. 1 of the drawings we have shown the coin chute secured to an upper bracket 43 and a lower bracket 43. These brackets are in turn fixed to the front wall of the framework. The coin chute 37 is of course given the proper inclination so as to bring the lower end thereof into operative relation to the coin carrier. The coin carrier is operated by means of the plunger 44 which is in the form of a hollow rod secured to the downward extension 45 of the coin carrier. Screws 46 on the extension 45 engage the annual flange 47 formed at the rear end of the plunger 44 and holds the same in fixed relation to the coin carrier. A coil spring 48 bears at one end against the front head of the hollow plunger and at the other end against the rear of the framework, to automatically return the coin-carrier to its normal position, as shown in Fig. 1. The spring 48 is coiled about a guide rod 49 extending forwardly from the rear wall of the framework. This guide rod extends partially into the hollow plunger and prevents the spring from buckling when the plunger is pushed in. To compel full inward movement of the coin carrier before it can return to normal position, we provide a double-acting pawl 50 pivotally mounted on a stud 51 carried by the base plate 31 of the coin carrier. A spring 52, coiled about the stud 51, is at one end fixed to the stud and at the other to the pawl, so as to normally hold the same in the position shown in Fig. 4. The flange 30 adjacent to the pawl 50 is provided with teeth 53 at each side of which is a recess 54. This arrangement of pawl and ratchet forms a well-known construction in vending machines to prevent return of the movable part carrying the pawl until it completes its stroke. No further description of this arrangement is therefore necessary.

In the sides of each framework is journaled the transverse shaft 55 which carries the operating lever 56. As will be explained later on in detail, the upper end of the lever 56 is connected with the ejecting mechanism which is slidably mounted on the top of the framework. A spring 57 normally holds the lever 56 in the position shown in Fig. 1. The spring is coiled about the shaft 55 and bears at one end against the pin 58 on the lever 56, while the other end engages the pin 59 projecting inwardly from one side of the framework. When the lever 56 is in normal position, its lower end 60 is in such relation to the coin carrier and the lower end of the coin chute 37, that a coin C will, at its upper edge, project slightly above said lower end 60 and in close proximity thereto. This is clearly shown in Fig. 1. The spring 57 tends to rock the lever 56 in a clockwise direction (as viewed in Fig. 1.) The movement of the lever in this direction is limited by the stop 61 which bears against the lever near its upper end. The stop 61 is best formed by bending a portion of the rear wall of the framework forwardly. To the rear wall of the casing is fixed a pair of brackets 62, as shown in Fig. 4. On a pin 63, journaled in these brackets, is mounted a coin stripper, or extractor, comprising a pair of stripping arms 64, an upward extension 65 and a lower extension 66. A leaf spring 67, secured to the rear wall of the framework F′, bears at its lower end against the upper extension 65 to hold the arms 64 in a substantially horizontal position, as shown in Fig. 1. The lower extension 66 limits the downward movement of the coin stripper by abutting against the rear wall of the framework. The stripping arms 64 are at their free end provided with hook portions 68 having inclined surfaces 69. As seen from Figs. 2 and 4, the arms of the coin stripper are arranged on either side of the operating lever 56.

The operation of the coin-controlled mechanism, as so far described, will now be clearly understood and is as follows: Assuming that a proper coin has descended through the chute 37 onto the coin-carrier 32, it will lean against the front wall of the laterally displaced extension 38 of the chute, with its upper edge in close proximity to the lower end 60 of the operating lever 56. If now the plunger 44 be pushed inwardly against the tension of the spring 48, the coin carrier 32 is moved rearwardly carrying with it the coin C. It will be clear from Fig. 1 that it needs but a very slight movement of the coin carrier to bring the pin 34 against the coin. As the coin carrier is moved inwardly, the upper edge of the coin engages the lower end 60 of the operating lever 56 and rocks the same into the position indicated in dotted lines 56′ in Fig. 1. During this movement of the coin carrier, the coin is held in rigid position on the coin carrier by means of the pin 34 and the groove or recess 36. In this way the coin forms a rigid movable connection between the coin carrier and the operating lever 56. When the coin comes into engagement with the stripping arms 64, it rides under the inclined surfaces 69, and rocks the arms upwardly until it passes by the hooked portion 68, whereupon the arms are rocked down under the influence of the spring 67. When the coin carrier returns, the coin encounters the hooked portion 68 of the stripping arms and is thereby tilted rearwardly until it falls from the coin carrier into the coin box 70 at the bottom of the casing.

The advantages of our new coin carrier will now be apparent. In the first place, should a washer find its way to the coin carrier, the pin 34 will enter the opening in the washer as the carrier is moved rearwardly, and instead of being propped up in rigid position, the washer will fall back onto the inclined surface 43 of the coin carrier. In this position, the upper edge of the washer will lie below the lower end of the operating lever, so that no connection is established between the coin carrier and the operating lever through the medium of the washer. When the coin carrier returns to normal position, the washer is stripped from the carrier the same as the proper coin will be, as above described in detail. The coin carrier is cut away at $33^a$ and $33^b$ to accommodate the stripping arms 64, so that the hooked portion 68 reaches lower than the washer on the surface 33 and strips the same from the coin carrier. Should the coin be of less than the prescribed weight, it will be held out of the coin-retaining groove by the upstanding projection $32^e$ on the weighted arm $32^b$. Should the coin carrier be pushed inwardly with the deposited check in this position, the engagement of the check with the lower end of the operating arm 56 will automatically cause the lower edge of the coin to ride upwardly on the ledge 35 of the coin carrier 32, whereby the check is automatically discharged from the carrier without causing operation of the arm 56. Another advantage of our new coin carrier is in the automatic testing of the coin as to diameter. It will be clear from Fig. 1 that if the coin be of smaller diameter than that of the coin C shown, the operating arm 56 would either not be engaged at all, or else engaged only during a part of the inward movement of the coin carrier. In the latter event, the operating lever 56 would not be rocked to its full extent, as indicated in dotted lines at 56′, and this incomplete movement would be insufficient to cause ejection of the articles from the associated magazine. Should the deposited coin be of soft or easily breakable material, it would not withstand the pressure of the pin 34 and would become either bent or broken. In either case, there would be no operation of the lever 56.

It will be obvious that in the broad aspect of our invention so far as the coin-carrier is concerned, the particular form or function of the member 56 is immaterial. In the particular machine illustrated, the member 56 is shown in the form of a pivoted lever, but, broadly speaking, the member or device to be engaged by the coin on the coin-carrier or coin-support 32 may be any suitable element contained in the machine and adapted to be actuated.

It may sometimes happen that a coin is deposited when a coin carrier is not in its normal position. To prevent the loss of such a coin to the patron, we have provided means for temporarily retaining such a coin in the coin chute until the coin carrier is moved back to normal position, whereupon the coin automatically drops on the coin carrier, and the machine may be operated in the usual way. In the present embodiment of our invention, this temporary retaining means comprises a depending arm 71 pivoted on the pin 72 which is mounted in a pair of ears or lugs 73 extending forwardly from the coin chute 37. The lower end of the arm 71 is provided with a lateral lug 74 which is arranged to bear against the coin carrier, as clearly shown in Figs. 1 and 4. From the rear of the arm 71 projects a supporting lug 75. When the coin carrier 32 is in its normal or unoperated position, as shown in Fig. 1, the arm 71 is held substantially vertical, so that the supporting lug 75 remains out of the coin chute 37. However, when the coin carrier is moved inwardly (toward the right as viewed in Fig. 1), the arm 71 is moved rearwardly by the spring 76 into the position shown in dotted lines in Fig. 1. The leaf spring 76 may be conveniently secured to the coin chute 37 by screws or rivets 77 and is arranged to bear at its lower end against the extension 78 on the arm 71. Any suitable means may be provided for swinging the arm 71 rearwardly when the coin carrier is moved out of normal position. When the arm 71 is in its operated position, the supporting lug 75 extends into the coin slot through an opening 79. With the arm 71 in this position, a deposited coin will be arrested by the lug 75 and temporarily remain in the position indicated at $C^2$ in Fig. 2. The coin will remain supported in this position until the coin carrier 32 returns to normal position and forces the arm 71 back into its normal position, as shown in full lines in Fig. 1. As soon as the lug 75 is withdrawn from the coin chute, a coin drops on to the coin carrier and the latter may then be pushed inwardly to actuate the operating lever 56.

The rear or upper side 80 of the coin chute 37 terminates in a rearwardly curved lip or flange 81 at some distance above the lower end of the coin chute, and thus provides a rear discharge opening 82 for magnetic slugs. A permanent magnet 82 is rigidly mounted by any suitable means on the upper side 80 of the coin chute in such a position that the poles of the magnet terminate at the guide flange 81. The means which we have shown for holding the magnet rigidly in place on the coin chute comprises a non-magnetic block 83 which is fixed to the upper side 80 of the coin chute and is of a shape to fit between the legs of the magnet. A non-magnetic bar 84 extends over the legs of the magnet, as shown in Fig. 2, and is held in place by a screw or pin 85 which passes into the block 83. In this way, the magnet is not only firmly held in place but may be readily removed by simply taking out the screw 85. When an iron slug passes down the coin chute 37, the magnet diverts it out of the coin chute through the opening 82, the flange 81 guiding the slug rearwardly and preventing the same from becoming attached to the poles of the magnet. The lower end of the actuating lever 56 is bent rearwardly away from the coin chute, as indicated at 86, so as not to interfere with the discharge of the magnetic slugs. When a slug is diverted by a magnet, it drops on the curved portion 86 of the lever from which it falls into the coin-box 70.

We will now describe the ejecting mechanism which is connected with the upper end of the actuating lever 56. As seen from Figs. 1 and 2, the upper end of this lever has a slot 87 in which engages the pin 88 carried by a pair of spaced lugs or ears 89 extending downwardly from the ejector plate 90. This plate is mounted to slide over the top flanges 91 of the framework $F^1$. As seen from Figs. 2 and 3, the sides of the plate 90 extend over the flanges 91, and retaining lugs 92 are provided on the plate 90 to engage the underside of the flanges 91 and thus prevent vertical displacement of the ejector plate. The lugs 92 may be conveniently struck up from the metal of the ejector plate 90. At its rear, the plate 90 is provided with a pair of spaced bearing lugs 93, as best shown in Fig. 3. A pin 94 is supported at its ends in the lugs 93 and has rotatably mounted thereon a substantially U-shaped framework indicated as a whole by E. This framework comprises a pair of forwardly extending arms 95 arranged beneath the plate 90 and connected at the rear by a crosspiece 96. The arms 95 are provided with upwardly extending portions 97, through which the pin 94 passes. The plate 90 is provided with an opening or cut-away portion 98 to allow the arms 95 to extend above the plate. The arms 95 are provided at their free end with upright ejecting lugs 99 having a vertical front surface 100 and an inclined or cam-shaped rear surface 101. These ejecting lugs extend through slots 102 in the ejector plate 90, and also through slots 103 formed in the transverse shelf or partition 15. The rear wall of each magazine is at the lower end provided with slots 104 through which the ejecting lugs 99 may freely pass to engage the lowermost article in the magazine and push the same out of the magazine. A spring 105 coiled about the pin 94 bears at one end on the ejector plate 90, as shown at 106, and at the other end on the crosspiece 96 of the framework E, as shown at 107. The spring 105 thus tends to throw the ejecting lugs 99 upwardly and hold them in an upright position, as shown in Fig. 1. The operation of the ejecting mechanism will now be clearly understood and may be briefly described as follows: When the lever 56 is operated through the medium of a deposited coin, as heretofore described in detail, the plate 90 is moved into the position shown in dotted lines in Fig. 1. During this movement of the ejector plate 90, the lugs 99 engage the lowermost article G (which is intended to represent a small box or package containing any suitable commodity), and pushes the same out of the magazine into the delivery chute D carried by the front panel 1 of the casing. During the return movement of the ejector mechanism from the position shown in dotted lines in Fig. 1 to that shown in full lines, the ejecting lugs 99 are automatically depressed and ride under the stack of articles. As soon as the lugs have cleared the magazine, they snap up into ejecting position under the action of spring 105.

Figure 6:
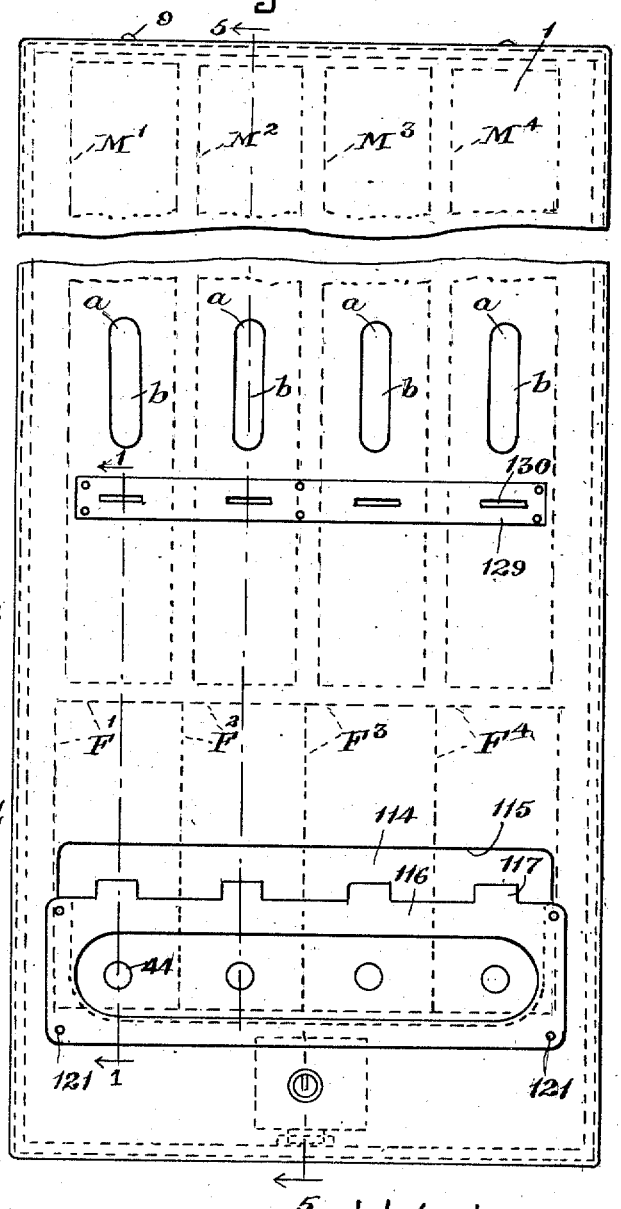
Fig. 6 is a front elevation of the machine.

The delivery chute D is preferably formed out of sheet metal and is secured to the front panel in any suitable way. This chute consists of sidewalls 108 and a rear wall 109 bent into shape as best shown in Fig. 1. At the top of the chute, the sides are extended inwardly to form the flanges 110 through which pass fastening pins or rivets 111 for securing the chute to the front panel. At its lower end, the rear wall 109 terminates in a flange 112 which rests against the front panel for receiving the fastening rivets 113. The rear wall 109 is curved rearwardly at 114 to form a deep recess or chamber opposite the opening 115 in the front panel. To prevent the ejected goods from falling out of the chamber 114, we provide a rearwardly-inclined shelf or ledge 116 which extends into the mouth of the delivery chute, as best shown in Fig. 1. The shelf 116 is carried by or forms part of an extension 117 provided on the plate 118. The form of this plate is best shown in Fig. 6. As the machine illustrated in this figure has four magazines, there will of course be four delivery chutes, or a common delivery chute may extend across the front panel to receive the goods from all of the magazines. There are as many retaining shelves 116 as there are magazines, and each shelf is arranged in vertical alinement with each magazine, so as to receive the goods ejected from that magazine. These retaining ledges need not be very wide. In fact, they should preferably be narrower than the coin required to operate the machine, because as will be presently explained, the refunded coins come out of the delivery chute D and rest upon the shelves 116. If the coin is wider than the shelf, it is more easily grasped by the patron. The position of a delivered package on the shelf 116 is indicated in dotted lines G′ in Fig. 1. This not only prevents the package from falling out of the delivery chute, but supports it in position to be easily withdrawn by the patron. A pair of guide rods 119 positioned at the upper end of the delivery chute assist in directing the ejected package properly down the chute. These rods are secured to a cross bar 120 mounted in the sides 108 of this chute.

The plate 118 is secured to the front panel by means of rivets 121, or in any other suitable way. This plate is formed with a recess 122 into which the plungers 44 extend. The recess 122 therefore forms a housing for the projecting ends of the plungers which terminate substantially flush with the front of the casing. The openings 123 in the rear wall of the recess 122 for receiving the plungers, are sufficiently large to permit the lower end of the front panel to be swung outwardly about the pins 9 as a pivot. As the openings 123 are at a considerable distance from the point of rotation of the front panel, they need not be very much larger than the diameter of the plungers.

We now come to that feature of our invention by which a coin deposited when the machine is empty, is automatically refunded through the delivery chute D. To the front panel above the delivery chute D is secured a hood 124 provided with a partition 125 which is spaced from the downwardly curved top 126 of the hood to form a coin chute 127. This coin chute may, of course, be formed in any other manner. The hood 124 is rigidly fastened to the front panel by rivets 124[a] passing through the panel and through lateral flanges 124[b] extending outwardly from the sides of the hood. These flanges are best shown on the modified form of hood illustrated on Fig. 8, but they are precisely the same on the form of hood shown in Fig. 1. The upper end of the coin chute is in alinement with an opening 128 formed in the front panel. This opening is covered by a plate 129 provided with a series of coin slots 130. There are of course as many coin slots 130 and coin chutes 127 as there are magazines in the machine. The bottom of the coin chute 127 is provided with an opening 131 of a width slightly smaller than the diameter of a prescribed coin, so that when a coin is deposited which is smaller than a coin intended for the machine, it will drop through the opening 131 into the delivery or refunding chute D. The coin chute 127 terminates at its lower end in alinement with a pivoted coin switch 132. This switch may be arranged in several ways, two of which have been shown in the drawings—one in Fig. 1 and the other in Fig. 7. Referring first to the switch as shown in Figs. 1 and 3, it will be observed that the switch is pivoted on a pin or rod 133 mounted in the sides 134 of a frame or bracket S secured to the lower end of the magazine by screws or rivets 135. As best shown in Fig. 3, these rivets pass through the front flanges of the magazines and corresponding flanges 136 extending outwardly from the sides 134 of the frame S. The coin switch 132 normally rests at its upper end against a crosspiece 137 provided on the frame or bracket S, and rests by gravity in the position shown in Fig. 1. At its lower end, the coin switch 132 is provided with a rearward extension 138 which is adapted to be engaged by the lug 139 formed on the weight 140 in the magazine, when the latter is empty. It will be clear from Fig. 1 that when the last package of goods has been discharged from the magazine, the weight 140 will descend to the bottom of the magazine and in doing so it will strike the projection 138, thereby rocking the switch 132 into the position shown in dotted lines. With the switch in this position, any coin descending through the coin chute 127 will be deflected by the switch into the delivery or refunding chute from which the patron may recover the coin. As soon as the weight 140 is moved up when the magazine is refilled, the switch 132 automatically assumes the position shown in full lines in Fig. 1. When in this, its normal position, the switch forms in effect a continuation of the coin chute 127 and directs the coin into the lower coin chute 37 from which it falls onto the coin carrier, as previously explained. The switch 132 may also be considered as a movable section of the coin passage which extends from the coin entrance slot 130 to the coin carrier 32, the other sections of this coin passage being the upper chute 127 and the lower chute 37.

In the modified arrangement of coin switch shown in Fig. 7, the coin switch 132′ is pivoted on the pin 133′ mounted in the sides of the hood 124′. When the switch is in normal position, the upper end 141 of the rear side rests against the lower end 142 of the top 126′, as indicated in dotted lines in Fig. 7. When the weight 140 has rocked the switch rearwardly, by engaging the extension 138′ thereon, the top 143 of the front side rests against the point 142, as shown in full lines in Fig. 7. The function and operation of the modified form of switch 142′ are precisely the same as that of the previously described form 132. Preferably the weight 140 is provided with an upper and lower lug 139 so that no matter how the weight is put into the magazine it will always be in position to operate the switch when the magazine is empty.

While we have herein shown a specific form of machine embodying the various features of our invention, it is understood that we do not intend to be limited to such construction, but that various changes and modifications may be made without departing from the scope of the invention as defined in the appended claims. Furthermore, it is apparent that certain features of our invention may be used without certain other features.

Having thus described our invention, what we claim as new and desire to secure by Letters Patent of the United States, is:

1. In a coin-operated vending machine, the combination with a movable coin carrier having a rigid extension adapted to sustain the coin in operative position on the carrier, of a movable member arranged to be engaged by the sustained coin and actuated thereby when said coin carrier is operated, said coin-carrier and said member being adapted to retain the coin in connecting position during their complete forward movement, and independent means for discharging the coin from said carrier during the return movement thereof.

2. In a coin-operated vending machine, the combination with a movable coin carrier having an inclined surface, a rigid extension projecting from said surface and adapted to engage the coin at or near the center thereof to sustain the same in operative position on the carrier, whereby a deposited check with an opening at the center is not sustained by said extension but falls on said inclined surface into an inoperative position, of a movable member arranged to be engaged by the sustained coin and thereby actuated when the coin carrier is operated, said coin-carrier and said member being adapted to retain the coin in connecting position during their complete forward movement, and independent means for discharging the coin from said carrier during the return movement thereof.

3. In a coin-operated vending machine, the combination with a movable coin carrier having a rigid extension adapted to hold the coin in operative position on the carrier, of a pivoted member having a portion projecting into the path of movement of the coin on the carrier, whereby said member is rotated by the coin, said coin-carrier and said member being adapted to retain the coin in connecting position during their complete forward movement, and independent means for discharging the coin from said carrier during the return movement thereof.

4. In a coin-operated vending machine, the combination with a coin carrier and means for reciprocating the same, said coin carrier having a rigid pin or extension adapted to sustain the coin in operative position on the carrier, of a pivoted member having a portion projecting into the path of movement of the sustained coin, whereby said member is rotated by the coin, said coin-carrier and said member being adapted to retain the coin in connecting position during their complete forward movement, and independent means for discharging the coin from said carrier during the return movement thereof.

5. In a coin-operated vending machine, the combination with a movable coin carrier having an inclined surface, a rigid pin projecting from said surface and adapted to engage the coin at or near the center thereof to hold the same in operative position on the carrier, whereby a deposited check with an opening at the center is not sustained by said pin but falls on said inclined surface in an inoperative position, of a pivoted member having a portion projecting into the path of movement of the coin on the carrier, whereby said member is rotated by the coin, said coin-carrier and said member being adapted to retain the coin in connecting position during their complete forward movement, and independent means for discharging the coin from said carrier during the return movement thereof.

6. In a coin-operated vending machine, the combination with a coin carrier and means for reciprocating the same, said coin carrier having an inclined surface, a rigid pin projecting from said surface and adapted to engage the coin at or near the center thereof to hold the same in operative position on the carrier, whereby a deposited check with an opening at the center is not sustained by said pin but falls on said inclined surface into an inoperative position, of a pivoted member having a portion projecting into the path of movement of the coin on the carrier, whereby said member is rotated by the coin, said coin-carrier and said member being adapted to retain the coin in connecting position during their complete forward movement, and independent means for discharging the coin from said carrier during the return movement thereof.

7. In a coin-operated vending machine, a pair of movable members normally disconnected from each other, one of said members being adapted to support a coin, and a rigid pin or extension on said last-mentioned member to hold the coin in position to establish operative connection between said members, said members being adapted to retain the coin in connecting position during the complete forward movement thereof, and independent means for ejecting the coin from between said members during the return movement thereof.

8. In a coin-operated vending machine, the combination with a coin carrier and means for reciprocating the same, said coin carrier having a rigid pin or extension adapted to hold the coin in operative position on the carrier, of a pivoted member having a portion projecting into the path of movement of the coin on the carrier, whereby said member is rotated by the coin, and a separate element for automatically dislodging the coin from said coin carrier during the return movement thereof.

9. In a coin-operated vending machine, the combination with a coin chute provided with a laterally displaced portion at its lower end, the side from which said lower end has been displaced being provided with a discharge opening above said displaced portion, of a movable coin carrier below said coin-chute for supporting a coin in said displaced portion, whereby a second coin dropped into the coin chute while a first coin is retained in said displaced portion, strikes the edge of said first coin off center and is thereby automatically ejected through said lateral opening.

10. In a coin-operated vending machine, the combination with a movable coin-carrier having a rigid extension adapted to sustain the coin in operative position on the carrier, of a movable member arranged to be engaged by the sustained coin and actuated thereby when said coin-carrier is operated, and a pivoted spring-pressed arm adapted to strip the coin from said carrier during the return movement thereof.

11. In a coin-operated vending machine, the combination with a horizontally slidable coin-carrier having a rigid pin or extension adapted to sustain the coin in operative position thereon, of a member pivotally mounted above said carrier and having its lower end in the path of movement of the sustained coin, said coin-carrier and said member being adapted to retain the coin in connecting position during their forward movement without ejecting the same.

12. In a coin-operated vending machine, the combination with a horizontally slidable coin-carrier having a rigid pin or extension adapted to sustain the coin in operative position thereon, of a member mounted wholly above said coin-carrier and in vertical alinement therewith, said member having its lower end extending into the path of movement of the sustained coin.

13. In a coin-operated vending machine, the combination with a horizontally slidable coin-carrier having a rigid pin or extension adapted to sustain the coin in operative position thereon, of a member mounted wholly above said coin-carrier and in vertical alinement therewith, said member having its lower end extending into the path of movement of the sustained coin, and independent means for discharging the coin from said coin-carrier during the return movement thereon.

14. In a coin-operated vending machine, the combination of a vertical swinging lever, a coin-carrier mounted to slide freely beneath the lower end of said lever without engaging the same, and a rigid pin or extension on said carrier to sustain a coin in position thereon to engage the lower end of said lever, whereby said lever and said coin-carrier become operatively connected and retain the coin in connecting position without ejecting the same.

15. In a coin-operated vending machine having an outer casing, a rectangular framework, a shaft supported in the sides of said framework, a vertical lever pivoted on said shaft, a coin-chute secured in said framework, a coin-carrier mounted in the lower portion of said framework and adapted to carry the deposited coin against the lower end of said lever, whereby said coin-carrier and said lever become operatively connected through the medium of the coin, a reciprocating push-rod connected with said coin-carrier and mounted in said framework, said push-rod projecting out of said casing for manual operation thereof, mechanism slidably mounted on top of said framework and connected with the upper end of said lever, and guides for removably mounting said framework within said casing so that said framework and the parts carried thereby may be readily removed from or inserted into said casing as a unit.

16. In a coin-operated vending machine, a readily removable unit framework supporting the following parts: a spring-pressed vertical lever pivoted substantially in the center of said framework, a coin chute in front of said lever, the lower end of said lever terminating in close proximity to the lower end of said coin chute, a coin carrier slidably mounted below said coin chute to receive the deposited coin, a push rod for moving said coin carrier rearwardly to bring the coin against the lower end of said lever, a yieldable member for engaging the coin on said coin-carrier during the return movement thereof and thereby discharging the same therefrom, and mechanism slidably mounted on said framework and operatively connected with the upper end of said lever.

17. In a coin-operated vending machine, a coin chute, a vertical operating lever pivotally supported at a point between its ends, the lower end of said lever terminating at the lower end of said coin chute, a slidable coin carrier arranged to receive the deposited coin and carry it against the lower end of said lever for actuating the same, means for operating said coin carrier, and an independent device adapted to engage the coin on said coin-carrier during the return movement thereof and thereby discharge the same therefrom.

18. In a coin-operated vending machine having a casing, a readily removable framework mounted in said casing, a vertical swinging lever pivoted in said framework, the rear wall of said framework having a portion bent toward said lever to form a stop for the same, a spring for normally holding said lever against said stop, and mechanism for operating said lever through the medium of a coin.

19. In a coin-operated vending machine, having a casing, a readily removable framework mounted in said casing, a vertical swinging lever pivoted in said framework, the rear wall of said framework having a portion bent toward said lever to form a stop for the same, a spring for normally holding said lever against said stop, mechanism for operating said lever through the medium of a coin, a spring-pressed arm pivoted in said framework and having a depending portion which normally bears against the wall of said framework to hold the arm in substantially horizontal position, the free end of said arm being adapted to strip the coin from said mechanism.

20. In a coin-operated vending machine, a coin chute, a vertical operating lever pivotally supported at a point between its ends, the lower end of said lever terminating at the lower end of said coin chute, a slidable coin carrier arranged to receive the deposited coin and carry it against the lower end of said lever for actuating the same, means for operating said coin carrier, a spring-pressed arm pivoted in said framework and having a depending portion which normally bears against the rear wall of said framework to hold the arm in substantially horizontal position, the free end of said arm being adapted to strip the coin from said coin carrier during the return movement of the latter.

21. In a coin-operated machine having a suitable element to be actuated, a movable coin-carrier adapted to support the deposited coin in a tilted position and to carry the same into operative relation to said element, and a yieldable member mounted on said coin-carrier and against which the deposited coin falls, said member being constructed and arranged to hold a coin or disk of less than the prescribed weight in an inoperative position on said coin-carrier and permitting said light-weight coin or disk to be tilted off said coin-carrier during its forward movement.

22. In a coin-operated vending machine, a coin carrier provided with a coin-retaining groove and a depressible projection in said groove to receive the deposited coin, said projection being adapted to hold a coin of less than the prescribed weight out of said groove, and means for actuating said coin-carrier to convey the deposited coin into operative position.

23. In a coin-operated machine having a suitable element to be actuated, a coin-carrier having means to retain a coin in operative position thereon, yieldable means mounted on said carrier for holding a coin of less than prescribed weight out of engagement with said retaining means, and means for actuating said coin-carrier to convey the deposited coin into engagement with said element.

24. In a coin-operated vending machine, the combination with a movable coin carrier having means to sustain a coin in operative position thereon, of a movable member arranged to be engaged by the sustained coin and actuated thereby when said coin carrier is operated, and means on said carrier for causing automatic discharge of a coin of less than the prescribed weight when the same engages said movable member.

25. In a coin-operated vending machine, the combination with a movable carrier having means to sustain a coin in operative position thereon, of a movable member arranged to be engaged by the sustained coin and actuated thereby when said coin carrier is operated, and a yieldable projection on said carrier for holding a coin of less than the prescribed weight in position to be automatically discharged from the coin carrier by said member without operating the latter.

26. In a coin-operated vending machine, a pair of movable members normally disconnected from each other, one of said members being adapted to rigidly support a coin to form an operative connection between said members, and means on said coin-supporting member for causing automatic discharge of a coin of less than the prescribed weight when said members are moved relatively to each other.

27. In a coin-operated vending machine, a pair of movable members normally disconnected from each other, one of said members being adapted to rigidly support a coin to form an operative connection between said members, and a yieldable projection on said supporting member to hold a coin of less than the prescribed weight in position to be automatically ejected from between said members when the same are moved relatively to each other.

28. In a coin-operated machine having a suitable element to be actuated, a movable coin-carrier provided with a pivoted arm having its free end arranged to be depressed by a coin of proper weight, means on said coin-carrier whereby a proper coin is operatively supported thereon, and means for actuating said coin-carrier to convey the supported coin into engagement with said element.

29. In a coin-operated vending machine, a movable coin carrier provided with a coin-retaining groove and a pivoted arm having its free end arranged to project into said groove, said free end being adapted to hold a coin of less than the prescribed weight out of said retaining groove.

30. In a coin-operated vending machine, a pair of movable members normally disconnected from each other, one of said members having means to support a coin in position to establish operative connection between said members, and a yieldable projection on said coin-supporting member to hold a coin of less than the prescribed weight in position to be automatically ejected from between said members when the same are moved relatively to each other.

31. In a coin-operated vending machine, a movable coin-carrier provided with a rigid projection and a shouldered recess arranged to sustain a coin of prescribed weight in operative position on said carrier, and a yieldable member mounted on said carrier and normally extending into said shouldered recess to prevent coins of less than prescribed weight from operatively engaging said shouldered recess.

32. In a coin-operated vending machine, a movable coin-carrier provided with a rigid projection and a shouldered recess arranged to sustain a coin of prescribed weight in operative position on said carrier, and a yieldable member pivoted on said carrier and normally extending into said shouldered recess to prevent coins of less than prescribed weight from operatively engaging said shouldered recess.

33. In a coin-operated vending machine, a movable coin-carrier provided at its forward end with a transverse rib or shoulder, a projection on said carrier above said shoulder, said projection and said shoulder being adapted to engage a coin of prescribed weight and sustain the same in operative position on said carrier, a movable member mounted on said carrier and adapted to hold a coin of less than the prescribed weight out of operative engagement with said shoulder.

34. A vending machine having means to support a stack of articles therein, a movable coin receiver below said articles and provided with a recess to receive a proper coin and retain its upper portion in position to dislodge a vendible article, said receiver having a member on one side of the coin above said recess to coact with the coin, said receiver also having a movable tongue extending across the upper part of said recess in the path of coins into the receiver, to prevent light-weight tokens from operatively entering said recess.

35. A vending machine having means to support a stack of articles therein, a movable coin receiver below said articles and provided with a recess to receive a proper coin, said recess being of less depth than the coin to expose the upper portion of the latter to dislodge a vendible article, said receiver having a member on one side of the coin above said recess to coact with the coin, said receiver also having a pivotal weighted tongue at the upper part of the recess in the path of coins into said recess adapted to be moved by a proper coin to permit its entrance into the recess with the upper part of the coin extending above the recess, said tongue being adapted to prevent light-weight tokens from operatively entering said recess.

36. In a coin-operated vending machine, a coin-carrier having a rigid pin or extension adapted to hold the coin in operative position thereon, manually operable means for actuating said coin-carrier, and a movable element supported above said coin-carrier and having a portion projecting into the path of the coin on said carrier, the coin on said carrier being retained in connecting engagement with said element during the forward movement of the carrier and automatically dislodged from the carrier during the return movement thereof.

37. In a coin-operated vending machine having an outer casing, a substantially rectangular framework, a shaft supported in the sides of said framework, a vertically swinging lever pivoted on said shaft, coin-receiving mechanism slidably mounted in said framework and adapted to become connected with the lower end of said lever through the medium of the deposited coin, said mechanism and said lever being normally disconnected, means mounted in said framework to guide the deposited coin into operative position on said mechanism, a reciprocating push-rod connected with said mechanism and projecting out of said framework for manual operation of said mechanism, a device connected with the upper end of said lever and arranged to slide on top of said framework, and guides for removably mounting said framework in said casing, so that said framework and the parts carried thereby may be readily removed from or inserted into said casing as a unit.

38. In a vending machine the combination of a lever, a member movable relatively thereto and independently thereof and provided with means to retain a coin in position to engage the lever when the member moves the coin toward the lever, means to guide a coin to said member, a coin extractor in position to permit the passage of the coin with the member in one direction to operate the lever, and to discharge the coin from said member when the latter moves in another direction, and means to operate said member.

39. In a vending machine the combination of a lever, a member movable relatively thereto and independently thereof and provided with means to retain a coin in position to engage the lever when the member moves the coin toward the lever, means to guide a coin to said member, a coin extractor movably supported in position to be operated by the coin to permit the passage of the latter when moved with said member to operate the lever and to discharge the coin from said member when the latter moves with the coin in another direction, and means to operate said member.

40. In a vending machine the combination of a lever, a member movable relatively thereto and independently thereof and provided with means to retain a coin in position to engage the lever when the member moves the coin toward the lever, means to guide a coin to said member, a coin extractor pivotally supported and having a portion at one side of the normal position of said member to be engaged by a coin thereon to permit the coin to pass the extractor when the member and coin move in one direction, a spring normally retaining said extractor in position to be operated by a coin on said member and to be released by the coin when the latter passes from the extractor, and a stop to retain the extractor in position to engage the coin on the return stroke of the member to discharge the coin therefrom.

41. In a vending machine, the combination of a lever, a member movable relatively thereto and independently thereof and provided with means to retain a coin in position to engage the lever when the member is moved in one direction to move the coin toward the lever, a coin extractor movably supported with relation to the member and coin, said extractor having a lug to coöperate with the coin when the latter is moved by the member, means to move the extractor to position its lug behind the coin when the coin passes beyond the lug to cause release of the coin from the member and lever when the member moves with the coin toward its normal position, and means to operate said member.

42. In a vending machine, the combination of a lever, a member movable relatively thereto and provided with means to retain a coin in position to operate the lever when the member is moved in one direction, a coin extractor movably supported with relation to the member and coin, said extractor having a lug to coöperate with the coin, means to move the extractor to position its lug behind the coin when the coin passes beyond the lug to cause release of the coin from the member and lever when the member moves toward its normal position, means to operate said member, said lug being forked to receive the portion of the lever coöperative with the coin, and means to operate said member.

43. In a vending machine, the combination of a lever having a shoulder, a member movable relatively thereto and provided with means to retain a coin in position opposing said shoulder to operate the lever when the coin is moved with the member on one stroke of the member, and means to release the coin from the member and lever on the return stroke of the member.

In witness whereof we hereunto subscribe our names this 9th day of Dec., 1919.

ALBERT D. GROVER.
EARL E. BARBER.